United States Patent [19]

Buhler et al.

[11]  4,265,924
[45]  May 5, 1981

[54] WHEY PROTEIN RECOVERY

[75] Inventors: Marcel Buhler, Tolochenaz; Mats Olofsson, Yverdon, both of Switzerland; Pierre-Yves Fosseux, Pont-Hebert, France

[73] Assignee: Societe d'Assistance Technique pour Produits Nestle S.A., Lausanne, Switzerland

[21] Appl. No.: 36,427

[22] Filed: May 7, 1979

[30] Foreign Application Priority Data

May 11, 1978 [CH] Switzerland ............. 5134/78

[51] Int. Cl.³ ................................. A23J 3/00
[52] U.S. Cl. .................................. 426/582; 426/622; 426/657; 426/491; 260/122
[58] Field of Search ............... 426/583, 657, 491, 582, 426/622; 260/112 R, 122

[56] References Cited

U.S. PATENT DOCUMENTS

| | | | |
|---|---|---|---|
| 2,602,746 | 7/1952 | Meade | 426/583 |
| 3,066,133 | 11/1962 | Pinckney | 426/491 X |
| 3,644,326 | 2/1972 | Pien | 426/656 X |
| 3,914,435 | 10/1975 | Maubois et al. | 426/491 X |
| 3,922,375 | 11/1975 | Dalan et al. | 426/583 |
| 3,963,837 | 6/1976 | Maubois et al. | 426/491 X |
| 4,042,575 | 8/1977 | Eustache | 426/583 X |
| 4,042,576 | 8/1977 | Eustache | 426/583 X |

Primary Examiner—Robert A. Yoncoskie
Attorney, Agent, or Firm—Watson, Leavenworth, Kelton & Taggart

[57] ABSTRACT

The present invention relates to a process for recovering proteins from lactoserum. This process comprises subjecting a lactoserum to a heat treatment to denature the proteins present in it and then separating the denatured proteins from the other non-fat constituents of the lactoserum by ultrafiltration. Alternatively, the ultrafiltered lactoserum, i.e. the retentate, is subjected to a complementary heat treatment for denaturing the proteins.

The proteins thus recovered may be used in dietetic or infant nutrition and in cheese making.

15 Claims, No Drawings

WHEY PROTEIN RECOVERY

This invention relates to a process for recovering proteins from lactoserum, also known as whey or milk serum.

Lactoserum is a by-product of dairy industries (cheese making, casein production, etc.) which contains proteins, sugars and mineral salts. One way of utilising this by-product is to extract from it the proteins which have a high nutritive value. Unfortunately, this is not easy from the economic point of view because these proteins are heavily diluted and are present in a very small proportion by comparison with the sugars, primarily lactose.

One process for recovering these proteins, known as the "Centri-whey" process, comprises denaturing the proteins by heat treatment at a pH-value of from 4.5 to 4.6 and subsequently isolating the denatured proteins by centrifuging. This process is attended by disadvantages, including the need to work at the pH-values indicated to enable centrifuging to be carried out with an acceptable yield on an industrial scale. The pH-value may be adjusted by the addition of onerous reactants, such as citric acid or lactic acid, which increases the production costs. Hydrochloric acid is more generally used, but the proteins recovered in this case are laden with chlorides and lose much of their attraction for certain dietetic applications or for their incorporation into cheese. In addition, the deproteinised serum recovered as by-product is difficult to use on account of its low pH-value and its high mineral element content. Finally, this process necessitates preliminary skimming of the whey to be treated, otherwise a product of poor organoleptic quality (due to the fat heated at an acid pH) would be obtained.

Another known process comprises separating the proteins from the other constituents of the lactoserum by ultrafiltration. In this way, the proteins are recovered in the state in which they are present in the lactoserum, i.e. in the non-denatured state. For certain applications, particularly infant dietetics, it is preferred to use denatured proteins which have proven to be more digestible.

An object of the present invention is to provide a process which obviates these difficulties whilst, at the same time, affording considerable and unexpected advantages. The present invention provides a process for recovering proteins from lactoserum which comprises subjecting a lactoserum to a heat treatment to denature the proteins present in it, after which the denatured proteins are separated from the other non-fat constituents of the lactoserum by ultrafiltration.

The lactoserum, whether emanating from cheese making or from casein production, normally has the following composition:

|  | Sweet lactoserum | Acid lactoserum |
|---|---|---|
| lactose | 4.0 to 5.0% | 4.0 to 5.0% |
| proteins (mainly lactalbumin) | 0.6 to 0.8% | 0.6 to 0.7% |
| mineral salts (primarily $Na^+$, $K^+$ and $Ca^{++}$) | 0.4 to 0.6% | 0.7 to 0.8% |
| fats | 0.2 to 0.4% | 0.05 to 0.1% |
| total dry extract (dry matter content) | 5.3 to 6.6% | 5.3 to 6.0% |
| acidity in degrees Dornic | 14 to 16° | 43 to 48° |
| pH | 5.9 to 6.5 | 4.3 to 4.6 |

It is pointed out that around 30% of the proteins are not denatured, i.e. insolubilised, under the conditions of the "Centri-whey" process. As they are not insolubilised, they are lost in the supernatant liquid. According to the invention, however, they are collected in admixture with the denatured proteins either in the non-denatured state or in the denatured state, depending on the thermal denaturing treatment applied to the lactoserum before ultrafiltration. In other words, the heat treatment in question may lead to only partial denaturing of the proteins.

In addition, in one advantageous variant of the process according to the invention, the ultrafiltered lactoserum, i.e. the retentate, is subjected to a complementary protein-denaturing treatment referred to hereinafter as post-denaturing.

The thermal denaturing of the proteins may be carried out in various ways, for example over a period of from 5 seconds to 2 minutes at a high temperature of from 120° to 160° C. or over a period of from 10 to 30 minutes at a lower tempeature of from 95° to 100° C. In the first case, the denaturing level varies between 35 and 45% and, in the second case, approaches 70%. These working conditions apply both to denaturing before ultrafiltration and also to post-denaturing. Obviously the denaturing level obtained by post-denaturing is distinctly higher for the same conditions by virtue of the lower content of lactose which has a protective effect with respect to proteins.

In cases where denaturing is followed by post-denaturing, the conditions of the heat treatment may be "crossed", for example denaturing for 5 seconds to 2 minutes at 120° to 160° C. and post-denaturing for 10 to 30 minutes at 95° to 100° C. (or vice versa). The total demineralisation level reached approaches the maximum theoretical denaturing level (of the order of 80% based on total proteins under the thermal denaturing conditions).

As well known, the ultrafiltration step may be carried out in a closed circuit by way of a buffer tank into which the retentate is recycled. It may also be carried out using several membranes or ultrafiltration modules arranged in series. The protein content of the lactoserum gradually increases, for example up to 60% which may be reached without any major difficulties. The content of the other constituents of the lactoserum remains unchanged, in other words the relative proportion of proteins has greatly increased. If it is desired to recover the proteins of which the residual lactose and mineral salt content is lowered in terms of absolute value, the retentate is diluted during ultrafiltration.

This technique of ultrafiltration with simultaneous dilution is occasionally referred to as "diafiltration". The diluent, mainly water, is added in the buffer tank or between two successive ultrafiltration modules.

The temperature at which ultrafiltration is carried out may be freely selected insofar as, since the proteins of the lactoserum have already been heat-treated, they are no longer in any danger of being harmed by heat. In order to achieve high ultrafiltration rates (high permeation levels) and also in the interests of bacteriological safety, it is preferred to carry out ultrafiltration at a temperature in the range from 55° C. to 80° C.

With regard to the advantages afforded by the process according to the invention, it is emphasised that, since the thermal denaturing step does not have to be carried out at a pH-value of from 4.5 to 4.6, it is possible to work at the actual pH-values of the lactoserums themselves which vary according to their origin and the storage period, if any. In particular, denaturing may be carried out at a pH-value of from 6.1 to 6.2 which, as a significant and decisive consequence, affords the possibility of treating crude lactoserums, i.e. non-skimmed lactoserums containing casein fines, whence:

- direct recovery of the residual casein without preliminary separation (eliminating the need for a decanter centrifuge);
- direct recovery of the fats (eliminating the need for a skimmer) which is industrially impossible in processes based on centrifuging for the reasons mentioned above;
- these constituents are combined in a single lactic concentrate together with the denatured serum proteins; and
- recovery of all the serum proteins.

It has been found for example that the losses of proteins, measured in relation to the total protein nitrogen of the lactoserum, are negligible. In no test did they exceed 6%. These losses generally amount to between 15% and 70% in the centrifuging process carried out at pH-values of from 4.5 to 4.6 both on account of the nature of the mechanical operations and on account of the proteins which are not denatured and which remain soluble.

Another equally important consequence is the fact that the serum proteins are recovered free from foreign chemical elements, such as mineral salts for example, and virtually at the pH-value of the starting milk, whence:

- possible utilisation in dietetics and infant nutrition when problems of renal strain are involved;
- easier utilisation in cheese making (little or no bearing on the acidification curve associated with cheese products).

Further advantages are afforded by the variant in which the proteins of the ultrafiltered lactoserum undergo a post-denaturing operation:

- greater reduction in the microbial population of the proteins collected by virtue of the two-fold heat treatment responsible for denaturing and post-denaturing;
- better protection of the lysine which is essential for the nutritional value of the product;
- a gentler global treatment in relation to a one-step treatment, post-denaturing being more effective for the same conditions or requiring milder conditions for the same effectiveness.

Compared with the process in which non-denatured proteins are subjected to ultrafiltration, the advantages are remarkable. Thus, higher permeation levels of 70 to 300% were measured at the same temperature when the proteins are denatured.

In one preferred embodiment of the process according to the invention, the proteins of a crude or skimmed lactoserum are denatured by heat treatment for 10 to 30 minutes at 95° to 100° C. either in a heat exchanger or by the injection of steam and storage in a tank, or for 10 seconds to 2 minutes at 120° C. to 160° C. either in a heat exchanger or by the direct injection of steam with residence in a tube at a pH-value of the order of 6.1 to 6.2. The lactoserum thus treated is then ultrafiltered at a temperature in the range from 55° C. to 75° C. If necessary, the retentate is diluted with water during ultrafiltration.

In a variant, the ultrafiltered lactoserum is subjected to a heat treatment known as post-denaturing which is identical with or different from the heat treatment applied to the starting lactoserum before ultrafiltration.

The proteins obtained are distinguished by their high quality and by a composition which is variable within very wide limits according to the methods used for denaturing and ultrafiltration. In particular, it is possible to obtain proteins of which the residual lactose and salt contents are remarkably low and of which the chloride content is insignificant. Proteins such as these are naturally used in dietectics, particularly infantile dietectics, and in cheese making. Particulars on this subject are given in the following Examples in which the percentages quoted represent % by weight based on dry matter.

EXAMPLE 1

An acid skimmed lactoserum having a pH-value of 4.6 is passed through a plate-type heat exchanger heated to 98° C., the residence time being of the order of 20 to 25 minutes. After cooling to 55° C., the lactoserum is introduced into an ABCOR ultrafiltration module equipped with HFM 180 SG membranes. Ultrafiltration is continued until a retentate approximately ten times smaller in volume than the starting lactoserum is obtained. Under these conditions, the permeation level amounts to 55 liters per square meter per hour. A final retentate having a dry matter content of 12 to 13% is thus obtained.

It has the following composition:

| Total nitrogen | Non-protein nitrogen | Proteins | Lactose | Ash | Fat |
|---|---|---|---|---|---|
| 7.53% | 0.50% | 45% | 43% | 6.8% | 1.9% |

EXAMPLE 2

The procedure is as described in Example 1, except that the lactoserum is heat-treated not in a plate-type heat exchanger, but instead by the injection of steam and holding the temperature at 98° C. for 20 to 25 minutes. The final retentate obtained in this way is comparable with that of Example 1.

EXAMPLE 3

The procedure is as described in Example 1 using skimmed acid lactoserum having a pH-value of 4.6. On this occasion, however, the pH-value is increased to 6.1 before the heat treatment by the addition of Ca (OH)$_2$. The permeation level during ultrafiltration amounts to 62 liters per square meter per hour. The final retentate obtained has a dry matter content of 13% and the following composition:

| Total nitrogen | Non-protein nitrogen | Proteins | Lactose | Ash | Fat |
|---|---|---|---|---|---|
| 7.4% | 0.48% | 44% | 45% | 7.1% | 1.8% |

EXAMPLE 4

A skimmed sweet lactoserum emanating from cheese making with a pH-value of 6.1 is treated by the injection of steam (temperature 98° C. maintained for 20 to 25 minutes). After cooling to 55° C., the treated lactoserum is introduced into the ABCOR module of Example 1 until a final retentate ten times smaller in volume than the starting lactoserum is obtained. A permeation level of 71 liters per square meter per hour is measured. The final retentate, which has a dry matter content of the order of 12.5%, has the following composition:

| Total nitrogen | Non-protein nitrogen | Proteins | Lactose | Ash | Fat |
|---|---|---|---|---|---|
| 7.9% | 0.40% | 48% | 43% | 6.4% | 1.7% |

EXAMPLE 5

A sweet crude lactoserum emanating from cheese making with a pH-value of 6.1 is treated by the injection of steam at 120° C. for 30 seconds. After cooling to 75° C., the treated lactoserum is introduced into the ABCOR module of Example 1 until a final retentate 15 times smaller in volume than the starting lactoserum is obtained. A permeation level of 89 liters per square meter per hour is measured.

The final retentate has a dry matter content of the order of 14% with a protein content of 58%, based on dry matter.

EXAMPLE 6

The procedure is as described in Example 5, except that a DDS ultrafiltration module equipped with GR OP membranes is used at a temperature of 55° C. A permeation level of 69 liters per square meter per hour is measured. The final retentate, which has a dry matter content of the order of 16 to 18%, has the following composition:

| Total nitrogen | Non-protein nitrogen | Proteins | Lactose | Ash | Fat |
|---|---|---|---|---|---|
| 9.4% | 0.42% | 57% | 29% | 5.1% | 2.2% |

EXAMPLE 7

The procedure is as in Example 5, except that a Union Carbide module of the UCARSEP 2 L 1 type having AJF membranes is used for ultrafiltration. The final retentate obtained is comparable with that of Example 5.

EXAMPLE 8

A crude sweet lactoserum emanating from cheese making is denatured by the injection of steam at a temperature of 98° C. (maintaining for 20 to 25 minutes) and, after cooling to 55° C., is passed once through the DDS module of Example 6, the volume of the retentate being kept constant by dilution with water. The ultrafiltration step lasts 50 minutes. Under these conditions, the permeation level amounts to 52 liters per square meter per hour. After ultrafiltration, dilution is stopped to obtain a retentate having a dry matter content of 8% and the following composition:

| Total nitrogen | Non-protein nitrogen | Proteins | Lactose | Ash | Fat |
|---|---|---|---|---|---|
| 12.5% | 0.20% | 79% | 6.3% | 3.2% | 5.0% |

The retentate is thermally concentrated to 50% of its volume and then dried in a tower.

EXAMPLE 9

The procedure is as described in Example 8 with regard to the denaturing of the lactoserum and the ultrafiltration operation with dilution to constant volume. After 50 minutes, the introduction of diluting water is stopped and ultrafiltration is continued until a retentate approximately 20 times smaller in volume than the starting lactoserum is obtained. The final retentate thus obtained has a dry matter content of the order of 15% and the following composition:

| Total nitrogen | Non-protein nitrogen | Proteins | Lactose | Ash | Fat |
|---|---|---|---|---|---|
| 13.1% | 0.19% | 82% | 3.6% | 3.0% | 5.2% |

EXAMPLE 10

The procedure is as described in Example 3, using crude acid lactoserum having a pH of 4.6. On this occasion, however, the pH-value is increased to 6.1 before the heat treatment by the addition of Ca(OH)$_2$. Under these conditions, the permeation level during ultrafiltration at 55° C. amounts to 51 liters per square meter per hour. The final retentate obtained has a dry matter content of 16% and the following composition:

| Total nitrogen | Non-protein nitrogen | Proteins | Lactose | Ash | Fat |
|---|---|---|---|---|---|
| 5.9% | 0.38% | 36% | 28% | 4.8% | 28% |

EXAMPLE 11

A crude sweet lactoserum emanating from cheese making with a pH-value of 6.1 is treated by the injection of steam (temperature 98° C. maintained for 20 to 25 minutes). After cooling to 55° C., the treated lactoserum is introduced into the ABCOR module of Example 1 until a final retentate 10 times smaller in volume than the starting lactoserum is obtained. A permeation level of 55 liters per square meter per hour is measured. The final retentate, which has a dry matter content of the order of 16%, has the following composition:

| Total nitrogen | Non-protein nitrogen | Proteins | Lactose | Ash | Fat |
|---|---|---|---|---|---|
| 6.3% | 0.39% | 38% | 27% | 4.0% | 29% |

EXAMPLE 12

A skimmed sweet lactoserum having a pH of 6.1 is treated by the injection of steam at 120° C. for 30 seconds. After cooling to 65° C., the lactoserum is introduced into the ABCOR module of Example 1 until a final retenate 10 times smaller in volume than the starting lactoserum is obtained. A denaturing level of 45% is measured. After ultrafiltration, a second heat treatment is carried out by the injection of steam at 120° C. for 60 seconds. On this occasion, a denaturing level of 70%, based on total proteins, is obtained.

EXAMPLE 13

The procedure is as described in Example 12, except that ultrafiltration is preceded by the injection of steam at 95° C. for 30 minutes, post-denaturing being carried out by the injection of steam at 120° C. for 60 seconds. In this case, the denaturing level amounts to 66%.

COMPARISON EXAMPLES

I. A skimmed acid lactoserum having a pH of 4.6 is passed through a plate-type heat exchanger heated to 98° C., the residence time being of the order of 20 to 25 minutes. After cooling to 40°–50° C., the lactoserum is introduced into an Alfa-Laval MRPX centrifuge rotating at 5650 revolutions per minute. A product having a dry matter content of 13% is recovered as sediment, its composition being as follows:

| Total nitrogen | Non-protein nitrogen | Proteins | Lactose | Ash | Fat |
|---|---|---|---|---|---|
| 10% | 0.3% | 62% | 20% | 5.0% | 2.0% |

Comparison of the protein nitrogen content of the starting lactoserum with that of the product obtained by centrifuging shows that approximately 62% of the proteins are recovered.

The same measurements made for Example 1 on the starting acid lactoserum and on the ultrafiltration retentate give a percentage recovery of the order of 96 to 100%. In other words, the yield obtained by the process according to the invention is much higher than the yield obtained by the process based on centrifuging.

The acid pH of the proteins recovered prevents them from being used in any dietetic products.

II. The procedure is as described in Comparison Example I using a skimmed sweet lactoserum having a pH of 6.1. Heating for 20 to 25 minutes at 98° C. in the plate-type heat exchanger causes the proteins to flocculate at this pH of 6.1, although it is impossible correctly to separate the phases by centrifuging at 5650 rpm. Centrifuging merely gives a sediment which only contains from 25 to 55% of the total starting protein nitrogen, from 29 to 75% of the proteins being in the denatured state, and a supernatant liquid which is not even completely clarified.

III. The procedure is as described in Comparison Example II, except that the pH of the skimmed sweet starting lactoserum is first adjusted to 4.6 by the addition of hydrochloric acid. The rest of the operations are carried out in the same way as in Comparison Example I, the product obtained having the following composition based on dry matter:

| Total nitrogen | Non-protein nitrogen | Proteins | Lactose | Ash |
|---|---|---|---|---|
| 9.8 | 0.3 | 61% | 20% | 6.4% |

This product invites the same criticism as the product of Comparison Example I.

In addition, the supernatant liquid ("deproteinised" lactoserum), which has both an acid pH and a high mineral element content, cannot readily be utilised.

IV. A skimmed sweet lactoserum, of the type obtained in the production of Gruyere cheese, is ultrafiltered in the ABCOR module mentioned above. Ultrafiltration is continued until a final retentate 10 times smaller in volume than the starting lactoserum is obtained. Under these conditions, a permeation level of 28 liters per square meter per hour is measured at 55° C. At lower temperatures, namely 15° C. and 30° C., which are more favourable to the integrity of serum proteins, the permeation levels measured are, respectively, 29 and 37 liters per square meter per hour.

The process according to the invention, which provides for permeation levels of from 55 to 89 liters per square meter per hour, is thus distinctly more effective and hence more economic.

EXAMPLE 15

A dietetic product for infants is prepared from the following ingredients (expressed as dry matter):

| | |
|---|---|
| denatured serum proteins (of Example 12) | 9% |
| wheat flour | 52% |
| sucrose | 20% |
| malto-dextrin | 10% |
| vegetable oil | 9% | plus vanilline and vitamines A, B1 and D3.

This product, which has a high nutritional value, forms an excellent weaning cereal.

EXAMPLE 16

In the otherwise traditional production of Camembert, denatured serum proteins of the type obtained in the form of a retentate in Example 4 are added to the starting milk on D-1 (i.e. one day before coagulation). The addition corresponds to 3 g (dry weight) of proteins liter of milk. The mixture is kept in a vat until day D where, after pasteurisation at 70° C., it is transformed into cheeses in the usual way.

The Camemberts obtained in this way are of excellent quality and normal in behaviour despite the presence of the denatured serum proteins.

We claim:

1. A process for recovering proteins from lactoserum, which comprises subjecting a lactoserum to a heat treatment to denature the proteins to an extent of about 35 to 70% by weight of the proteins present in it, separating the denatured proteins from the other non-fat constituents of the lactoserum by ultrafiltration, said proteins being found in the ultrafiltration retentate along with undenatured proteins, and subjecting the retentate to a complementary heat treatment for a time and temperature sufficient for denaturing the undenatured proteins.

2. A process as claimed in claim 1, wherein the lactoserum used is a skimmed lactoserum.

3. A process as claimed in claim 1, wherein the lactoserum used is a crude lactoserum.

4. A process as claimed in claim 1, wherein the lactoserum is subjected to a heat treatment at a pH of from 4.5 to 4.6.

5. A process as claimed in claim 1, wherein the lactoserum is subjected to a heat treatment at a pH of from 6.1 to 6.2.

6. A process according to claim 5 in which the lactoserum is an acid lactoserum of which the pH has been adjusted to 6.1 to 6.2 by addition of alkali.

7. A process as claimed in claim 1, wherein the denatured proteins are separated from the other non-fat constituents of the lactoserum by diafiltration in which the lactoserum is subjected to ultrafiltration with the simultaneous dilution of the retentate with aqueous liquid.

8. A process as claimed in claim 1, wherein the heat treatment is carried out for 5 seconds to 2 minutes at 120° to 160° C. or for 10 minutes to 30 minutes at 95° to 100° C.

9. A process as claimed in claim 1, wherein the complementary heat treatment is carried out for 5 seconds to 2 minutes at 120° to 160° C. or for 10 minutes to 30 minutes at 95° to 100° C.

10. A process as claimed in claim 1, wherein ultrafiltration is carried out at a temperature of from 55° to 80° C.

11. A process as claimed in claim 1, wherein the proteins are recovered in dry form by drying the ultrafiltration retentate after the complementary heat treatment.

12. Proteins of lactoserum when recovered by a process as claimed in claim 1.

13. An infant or dietetic food product including as an ingredient proteins of lactoserum as claimed in claim 12.

14. Cheese including as an ingredient proteins of lactoserum as claimed in claim 12.

15. A process as claimed in claim 1, wherein the lactoserum is a sweet or acid lactoserum.

* * * * *